United States Patent [19]
Wilson

[11] Patent Number: 5,347,323
[45] Date of Patent: Sep. 13, 1994

[54] SUNGLASSES

[76] Inventor: Ken Wilson, 9926 Prospect Ave., #131, Santee, Calif. 92071

[21] Appl. No.: 753,806

[22] Filed: Sep. 3, 1991

[51] Int. Cl.$^5$ .................................................. G02C 7/02
[52] U.S. Cl. .......................................... 351/44; 351/47
[58] Field of Search ............................... 351/44, 47

[56] References Cited

U.S. PATENT DOCUMENTS

| | | | |
|---|---|---|---|
| 2,824,309 | 2/1958 | Fleming | 351/44 X |
| 4,070,103 | 1/1978 | Meeker | 351/47 X |
| 4,741,611 | 5/1988 | Burns | 351/44 |
| 4,859,048 | 8/1989 | Jannard | 351/44 X |
| 4,867,550 | 9/1989 | Jannard | 351/44 X |
| 4,934,807 | 6/1990 | Bolle et al. | 351/44 X |
| 4,951,322 | 8/1990 | Lin | 351/44 X |

Primary Examiner—Do Hyun Yoo
Attorney, Agent, or Firm—Charles C. Logan II

[57] ABSTRACT

A pair of sunglasses having an elongated lens support frame member having a pair of elongated grooves formed in its bottom surface for detachably receiving a left lens and a right lens. The lenses have a constant radius in the horizontal planes extending from their top edge to their bottom edge. The grooves in the lens support frame member have a predetermined asymetric curvature that requires the lenses to be bent during insertion or removal. The temple members in sequence from their front end to their rear end have a forward portion, an intermediate correctly oriented letter shaped portion, and a rear portion. The letter shaped portions when viewed from either side of the wearer's head have the same correctly oriented letter design incorporated in the structure of the temple member.

2 Claims, 2 Drawing Sheets

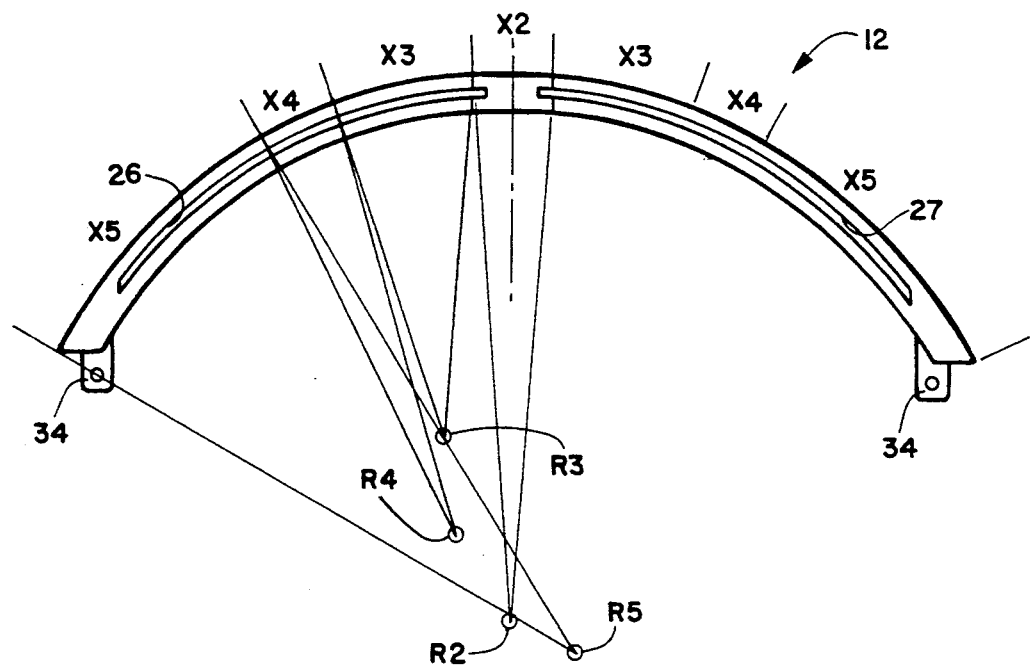
FIGURE 3
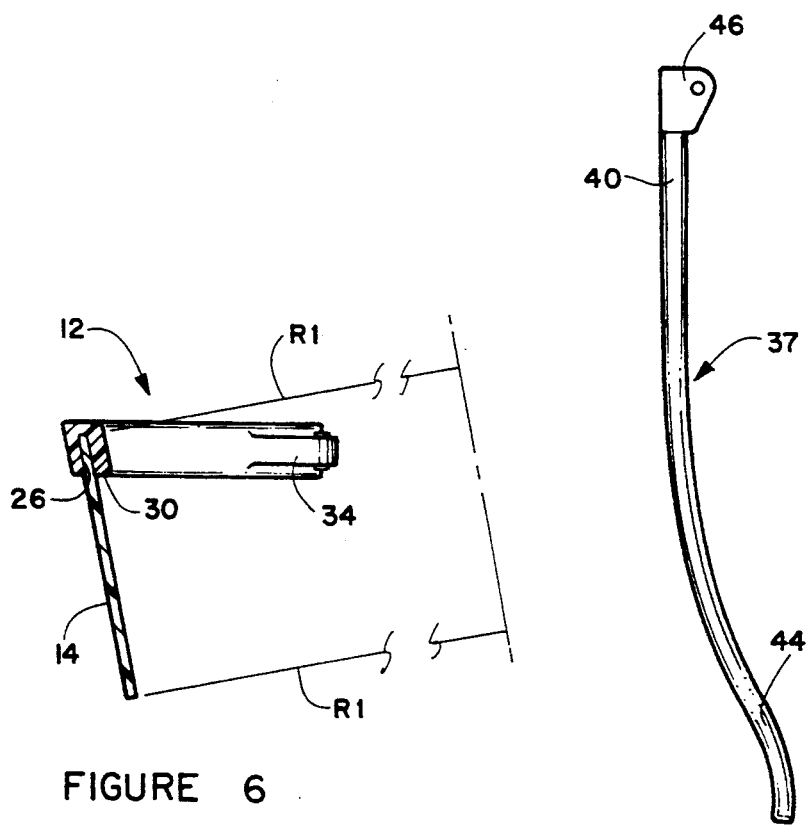
FIGURE 6
FIGURE 7

SUNGLASSES

BACKGROUND OF THE INVENTION

The invention relates to sunglasses and more specifically to a pair of sunglasses having two specifically contoured lenses and also having elongated temple members that incorporate in their design a letter shaped portion that is correctly oriented when viewed from either side of the wearer's head.

Sunglasses have long been designed with the general objective of blocking the sun or other sources of bright light, from one's eyes. Numerous designs of dual lens glasses and single lens glasses have been developed, differing only in aesthetic features. Of primary importance in designing the geometry of the lenses, there continues to be a pursuit of a design that is best for blocking glare to the wearer's eyes. It has been found that individual lenses having a constant radius in their horizontal planes from their top edge to their bottom edge produce excellent characteristics for blocking the glare of the sun.

Another problem that exists is in designing the frame of the sunglasses to give them an optimal configuration for conforming to the shape of a person's head. Most people's heads are not completely spherical and therefore present day sunglasses that have a constant radius of curvature in their horizontal plane do not properly conform to a person's head. It has been found that an asymetrical elongated lens support frame can be made to properly conform to the shape of most wearer's heads.

The design of temple members for sunglasses have taken on new importance in that now they have an aesthetic design significance in addition to the function of providing structure for holding the sunglasses on the side of a person's head. Presently all temple members for sunglasses have a left temple member that is merely a mirror image of the right temple member. No one has designed a temple member that incorporates a letter shaped portion that would require designing the two individual temple members so that the letter is properly oriented when viewed either from the left or right side of the sunglasses wearer.

It is an object of the invention to provide a novel multi-component sunglasses assembly which allows the temples, lenses, nose piece, and lens support frame to be interchanged with other like pieces of different colors.

It is another object of the invention to provide a novel multi-component sunglasses assembly whose components can be snapped together and snapped apart thereby requiring minimal assembly and disassembly time.

It is another object of the invention to provide a novel pair of sunglasses that utilizes a pair of lenses that each have a constant radius of curvature in their horizontal planes from their top edge to their bottom edge.

It is an additional object of the invention to provide a novel pair of sunglasses that has an elongated lens support frame with an asymetrical curvature that more closely approximates the curvature of the sunglasses wearer's head.

It is a further object of the invention to provide a novel pair of sunglasses that has temple members that incorporate correctly oriented letter shaped portions that have a pleasant aesthetic appearance.

SUMMARY OF THE INVENTION

The novel sunglasses have been designed to be formed of multiple-components (such as temples, nosepieces, lenses and lens support frame) that can be easily snapped together and snapped apart by the wearer. This allows the user to interchange components having different colors to form various stylish color coordinated sunglasses.

The sunglasses have been designed to have a pair of lenses that have a constant radius in their horizontal planes from their top edges to their bottom edges. The lenses in essence have a configuration that approximates arcuate sections of a cylinder. The elongated lens support frame has a pair of grooves formed in its bottom wall for receiving the top edges of the two respective lenses. These grooves have an asymetrical curvature to them that requires the lenses to be bent slightly from their constant radius configuration so that they can be inserted into these grooves. This difference in curvature also produces structure for frictionally holding the two parts together.

The temple members have been designed to incorporate a letter shaped design in the intermediate portion of the temple member. Since most letters are not symetrical, the design of the temple members has been styled to incorporate the letter shaped portions in their proper orientation, whether viewed from either the left or right side of the wearer.

DESCRIPTION OF THE DRAWINGS

FIG. 3 is a bottom plan view of the elongated lens support frame member;

FIG. 6 is a cross sectional view taken through the lens support frame member and one of the lenses; and FIG. 7 is a top plan view of the left temple member.

DESCRIPTION OF THE PREFERRED EMBODIMENT

Figure 1:
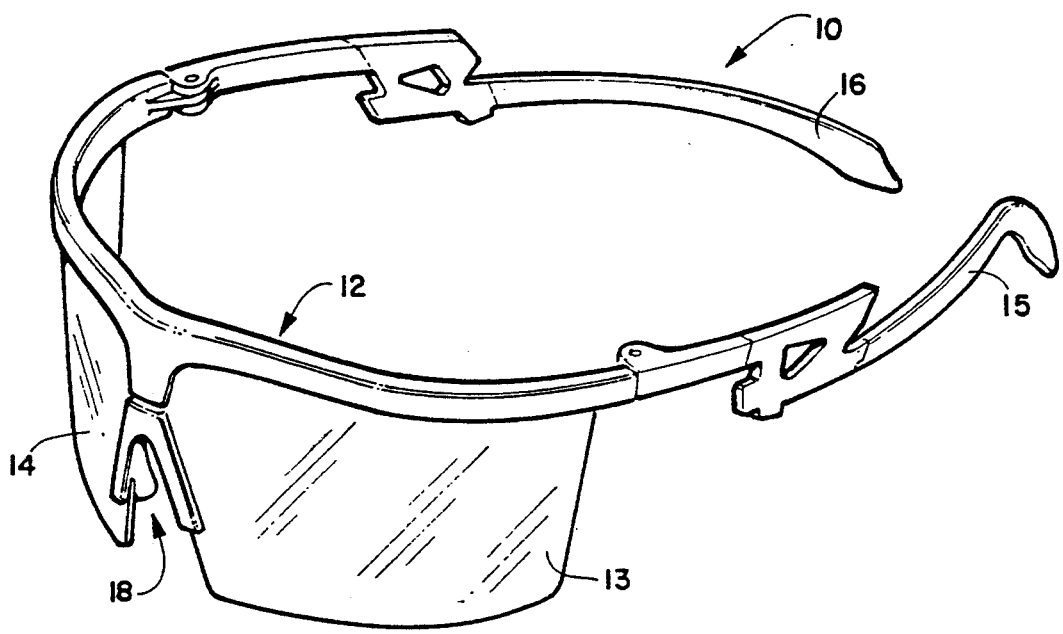
FIG. 1 is a front perspective view of the novel pair of sunglasses.
Figure 2:
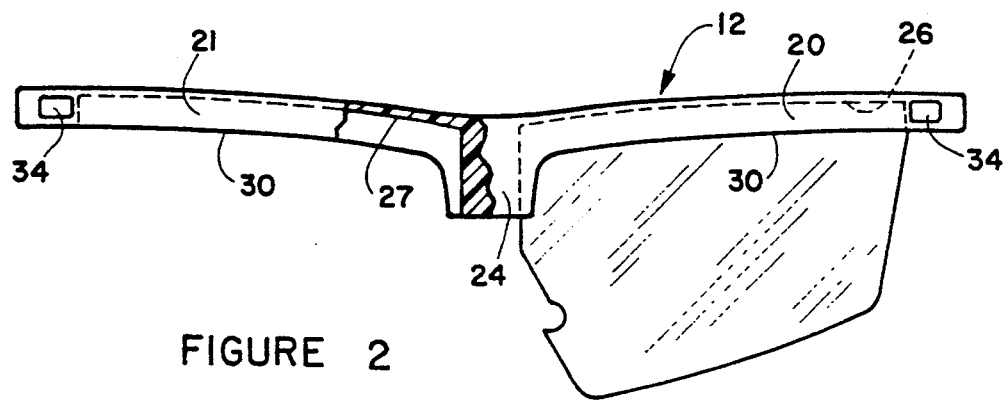
FIG. 2 is a rear elevation view of the elongated lens support frame member with portions broken away and also illustrating one of the lenses mounted therein.

The manner in which the novel pair of sunglasses has been designed to produce improved structure will be best understood by referring to FIGS. 1-7 of the drawings. In FIG. 1, the sunglasses are generally designated numeral 10. They have an elongated lens support frame 12, a pair of lenses 13 and 14, and a pair of temple members 15 and 16. A nose assembly 18 is detachably connected to the respective lenses 13 and 14.

Elongated lens support frame member 12 has a left lens support portion 20 and a right lens support portion 21. A downwardly extending post member 24 is located between the respective left and right lens support portions 20 and 21. Formed in bottom wall 30 of lens support frame member 12 are a pair of grooves 26 and 27 having an asymetric curvature. The asymetric curvature of the lens support frame member 12 is best understood by referring to FIG. 3. The central portion has a width X2 that is equal to 0.512 inches and it has a radius R2 equal to 3.390 inches. The lens support frame member is symetrical on both sides of portion X2 and only one of these sides will be discussed. Portion X3 has a width 0.878 inches and it has a radius R3 equal to 3.230 inches. Portion X4 has a predetermined width and a predetermined radius R4. Portion X5 has a width 1.850 inches and it has a radius R5 equal to 3.872 inches. Tabs 34 extend from the respective left and right ends of lens support frame member 12.

Figure 5:
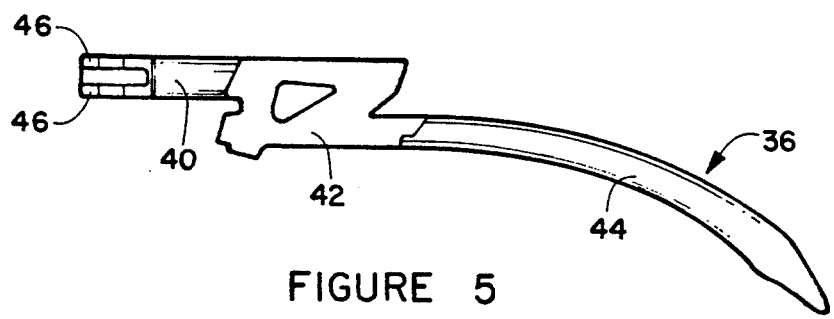
FIG. 5 is a side elevation view of the left temple member.
Figure 4:
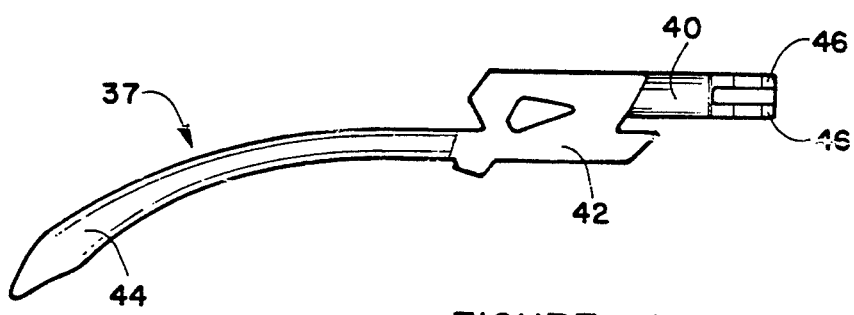
FIG. 4 is a side elevation view of the right temple member.

Left temple member 36 and right temple member 37 are illustrated in FIGS. 4 and 5. These temple members each have a forward portion 40, a letter shaped intermediate portion 42, and a rear portion 44. A pair of vertically spaced ears 46 are formed on forward portion 40. In the specific embodiment illustrated, portion 42 is shaped in the form of the letter R. It should be noted that the letter shaped intermediate portions 42 have their letter properly oriented for viewing from the respective left and right sides of the wearer's head.

In FIG. 6, a vertical cross sectional view through lens support frame 12 and lens 14 shows that the lens has a constant radius R1 from its top edge to its bottom edge. Groove 26 is formed in bottom wall 30 at an upwardly and forwardly inclined angle.

What is claimed is:

1. A pair of sunglasses comprising:

an elongated lens support frame member having a left end and a right end, said lens support frame member further having a left lens support portion and a right lens support portion, and a downwardly extending post member being located between said left and right lens support portions and also being connected to them;

a left lens having a top edge, a bottom edge, a left edge, a right edge and a front surface, said left lens further having a substantially symmetrical curvature R1 in its horizontal plane;

a right lens having a top edge, a bottom edge, a left edge, a right edge and a front surface, said right lens further having a substantially symmetrical curvature R1 in its horizontal plane;

said left and right lens support portions each having a top wall, a bottom wall, a front wall and a rear wall; a groove is formed in the bottom wall of each of said left and right lens support portions for detachably receiving the top edges of said respective left and right lenses, the curvature of said grooves in their horizontal plane being asymmetrical so that the respective lenses have to be bent while installing them into said grooves;

said post member having a left edge and a right edge and a horizontal radius R2 of curvature and a width X2 between the left and right edges of the post member;

said left lens support portion having in sequence from the left edge of the post member: a width X3 having a radius R3, a width X4 having a radius R4, and a width X5 having a radius R5;

said right lens support portion having in sequence from the right edge of the post member: a width X3 having a radius R3, a width X4 having a radius R4, and a width X5 having a radius R5;

X2, X3, X4 and X5 are all different widths and R2, R3, R4 and R5 are different radii wherein $R4 > R3$, $R2 > R4$, $R5 > R2$, and $X3 > X4$, $X5 > X3$;

a pair of elongated temple members each having a front end;

means for pivotally connecting the front ends of said temple members to the respective left and right ends of said lens support frame member.

2. A pair of sunglasses as recited in claim 1 wherein said grooves are formed in the bottom walls of said lens support portions at an upwardly and forwardly inclined angle.

* * * * *